United States Patent
Le Rouzic et al.

(10) Patent No.: US 9,021,300 B2
(45) Date of Patent: Apr. 28, 2015

(54) METHOD OF CHANGING OVER FROM A PRIMARY HSS TO A BACKUP HSS IN AN IP NETWORK

(75) Inventors: Jean-Claude Le Rouzic, Trebeurden (FR); José Doree, Lannion (FR)

(73) Assignee: Orange, Paris (FR)

( * ) Notice: Subject to any disclaimer, the term of this patent is extended or adjusted under 35 U.S.C. 154(b) by 247 days.

(21) Appl. No.: 13/511,737

(22) PCT Filed: Nov. 22, 2010

(86) PCT No.: PCT/FR2010/052476
§ 371 (c)(1),
(2), (4) Date: May 24, 2012

(87) PCT Pub. No.: WO2011/064492
PCT Pub. Date: Jun. 3, 2011

(65) Prior Publication Data
US 2012/0290871 A1    Nov. 15, 2012

(30) Foreign Application Priority Data

Nov. 27, 2009 (FR) ...................................... 09 58456

(51) Int. Cl.
*G06F 11/20* (2006.01)
*H04L 29/06* (2006.01)
*H04L 29/14* (2006.01)

(52) U.S. Cl.
CPC ........ *H04L 65/1016* (2013.01); *H04L 65/1006* (2013.01); *H04L 65/105* (2013.01); *H04L 69/40* (2013.01)

(58) Field of Classification Search
USPC ..................... 714/4.11, 4.12, 4.13, 6, 6.3, 15; 370/216; 709/223, 220, 221
See application file for complete search history.

(56) References Cited

U.S. PATENT DOCUMENTS

| | | | |
|---|---|---|---|
| 7,484,115 B2* | 1/2009 | Zhu et al. | 714/4.12 |
| 7,844,745 B1* | 11/2010 | Darbyshire et al. | 710/3 |
| 8,625,433 B2* | 1/2014 | Lafuente Alvarez et al. | 370/237 |
| 2003/0126199 A1* | 7/2003 | Kadri et al. | 709/203 |
| 2004/0109406 A1* | 6/2004 | Rothman et al. | 370/216 |
| 2005/0060411 A1* | 3/2005 | Coulombe et al. | 709/227 |
| 2006/0294207 A1* | 12/2006 | Barsness et al. | 709/220 |
| 2008/0117075 A1* | 5/2008 | Seddigh et al. | 340/825.36 |
| 2008/0227451 A1* | 9/2008 | Fukui et al. | 455/435.1 |

FOREIGN PATENT DOCUMENTS

| | | | |
|---|---|---|---|
| WO | WO 2008/046266 A1 | 4/2008 | |
| WO | WO 2008/046270 A1 | 4/2008 | |
| WO | WO 2009/080095 A1 | 7/2009 | |

* cited by examiner

*Primary Examiner* — Joseph Schell
(74) *Attorney, Agent, or Firm* — Drinker Biddle & Reath LLP

(57) ABSTRACT

A method is provided for changing over from a primary home subscriber server (HSS) to a backup HSS in an IP network, said network having a plurality of call server control function (CSCF) (or application) servers, in which, after detection of a loss of connection between one of said CSCF (or application) servers and a primary HSS to which it is normally connected, the CSCF (or application) server connects itself to a backup HSS. The method also comprises the following steps: a) a predetermined broadcast device is informed of said loss of connection with said HSS; b) said broadcast device sends a predetermined fault message at least to the other CSCF (or application) servers that are normally connected to said primary HSS, said message containing the reference of said primary HSS; and c) said other CSCF (or application) servers connect themselves to said backup HSS.

16 Claims, 3 Drawing Sheets

METHOD OF CHANGING OVER FROM A PRIMARY HSS TO A BACKUP HSS IN AN IP NETWORK

CROSS-REFERENCE TO RELATED APPLICATIONS

This application is the U.S. national phase of the International Patent Application No. PCT/FR2010/052476 filed Nov. 22, 2010, which claims the benefit of French Application No. 09 58456 filed Nov. 27, 2009, the entire content of which is incorporated herein by reference.

FIELD

The present invention relates to Internet protocol (IP) networks and amongst such networks it relates in particular to IP networks that are suitable for implementing advanced session control protocols. IP networks enable conversational data, such as "voice over IP" (VoIP), "content sharing", "presence", or "instantaneous messaging", to be transmitted.

BACKGROUND

More particularly, the present invention relates to the consistency of client information recorded in such a network, and thus to consistency in processing by the network of conversational data relating to such clients.

The client devices to which such resources are accessible may for example be a fixed or mobile terminal, or a residential gateway (that may be in a home or a business gateway), or indeed a voice gateway such as a DSLAM-SIP (where DSLAM stands for digital subscriber line access multiplexer, i.e. a device that collects digital subscriber line (DSL) data transiting over some number of telephone lines).

Conventional advanced session control protocols, such as SIP (standing for session initiation protocol) make use of so-called "signaling" messages, which are messages that enable a terminal to request a connection with another terminal, or likewise messages signaling that a telephone line is busy, or signaling that a called telephone is ringing, or indeed signaling that the telephone is connected to the network and may be reached in such and such a manner.

SIP is defined by the Internet Engineering Task Force (IETF) in Document RFC 3261. That protocol enables multimedia sessions to be set up, modified, and terminated in a network making use of IP. SIP also accommodates event notification procedures and the sending of information that is outside the context of a session. It is in widespread use for instantaneous messaging service commands. Thus, in an SIP environment, there exist various types of communication such as requests to set up sessions and requests that are exchanged outside any dialog.

The invention is particularly suitable for infrastructures of the IP multimedia subsystem (IMS) type. IMS is defined by the standardizing organizations of the 3rd generation partnership project (3GPP), and by telecommunications and Internet converged services and protocols for advanced networking (TISPAN). It is a network architecture introduced by the 3GPP for mobile networks, and has subsequently been taken over by TISPAN for fixed networks. That architecture, which makes use of SIP, enables multimedia sessions to be set up dynamically and controlled between two clients and also enables resources to be reserved in the network that transports the multimedia streams. By means of that architecture, network operators can conveniently implement a management policy for delivering a predetermined quality of service (QoS), and can calculate the amounts to bill their clients. At present, IMS makes it possible to access services of the telephone, videophone, presence, and instantaneous messaging types, in which it also manages interaction.

When a user seeks to benefit from services made available by an IP network, such as those described above, the user sends signaling messages to the network that may, in particular, include various types of request.

Firstly, the user terminal must register itself with the network. When the network is not capable of making the connection between that registration and an earlier registration (e.g. after a network fault, or after the terminal has been switched off for a duration longer than a predetermined value), the registration is considered as being an initial registration. After an initial registration, the user terminal must periodically send a request to the network in order to confirm that it desires to maintain its registration.

Thus, in order to be able to register clients, IP networks such as those described above include one or more servers generally referred to as serving-call server control function (S-CSCF) servers that are suitable (amongst other things) for managing the procedure for registering devices connected to the network.

In addition, those networks include one or more interrogating-call server control function (I-CSCF) servers that, when registering a client device, interrogate a home subscriber server (HSS) in order to be able to select an S-CSCF server that possesses the characteristics that are required necessarily (and, depending on circumstances, optionally) for reaching the level of service to which the client has subscribed.

Each client device may send a request to an S-CSCF server that has been allocated thereto for subscribing to certain services for the current connection. This may be an event notification service: for example, when the user of a terminal has a voice mailbox on the network, the terminal may subscribe to notification that a message has been deposited, i.e. the user may request to be informed each time a message is recorded in that voice mailbox; likewise, the user terminal may request to be notified about its registration state; it may also subscribe to a presence-notification service enabling it to receive information published by some other user it has designated, and so on. After the initial subscription request, the terminal must periodically send a request to the network in order to renew its subscription.

The above-mentioned S-CSCF servers contribute to implementing those various services by managing the routing of signaling, firstly between each client device and the network servers that are specialized in implementing such and such a service to which the client has subscribed, and secondly to other clients managed by the same network or by a network to which it is connected.

In order to be able to route those various requests within the network, servers of the I-CSCF or of the S-CSCF type (which servers are often combined as a single server, then written I/S-CSCF) exchange information with one or more servers of the above-mentioned HSS type. Each HSS contains a client database and is thus equivalent in IP networks of a home location register (HLR) of the kind used in GSM (global system for mobiles) networks. Each HSS contains the "profile" of some number of clients of the network, which profile includes their registration state, authentication and location data, and the services to which they have subscribed.

HSSs thus perform a major role in the operation of such a network, and it is essential that the dynamic information they contain is exact in order to enable the network to operate properly. That is why provision is generally made to associate each "normal" ("primary") HSS with a "backup" ("secondary") HSS that is ready to replace the primary HSS in the event of it suffering a fault.

However, such an arrangement has been found by the inventors of the present invention to lead to a real danger concerning consistency in how the network processes information about clients.

Here is a simple example of how inconsistency can be caused by switching over to a backup HSS in a network that has a plurality of I-CSCF servers (or functions) and a plurality of S-CSCF servers (or functions). It should be observed that in such a network, incoming calls from the public switched telephone network (PSTN) are usually distributed fairly over the set of I-CSCF servers; these servers then interrogate the HSS in order to determine the S-CSCF server to which each incoming call should be routed.

Assume for the time being that the connection between a certain I-CSCF server (referred to as the "server C2", that also hosts an S-CSCF server) and the primary HSS becomes faulty, such that the server C2 switches over to the backup HSS. The backup HSS is then informed by the server C2 on each occasion that a client registers subsequently with the network via the server C2. If at this time an incoming call for one of these clients newly registered on the backup HSS is entrusted to the server C2, then the call will be processed correctly since the server C2 will interrogate the backup HSS in order to determine which S-CSCF is in charge of the client. In contrast, if the call for the same client is entrusted to a server other than the server C2 (this server is called "server C1", and it likewise hosts an S-CSCF server), and if that other server C1 has not lost its connection with the primary HSS, then when the server C1 interrogates the primary HSS it will reach the erroneous conclusion that the client concerned is not registered, so the call will be routed to the client's voice mailbox instead of being transmitted directly to the client.

As explained in detail above, that problem that affects CSCF servers also affects so-called application servers (AS) such as voice messaging servers, presence servers, and telephony servers, since these ASs need to consult an HSS when depositing or recovering service data.

Unfortunately, in prior art IP networks, the above-mentioned inconsistencies do not disappear until a global restart of the network, since the problems raised by switching over to a backup HSS are not taken into account.

SUMMARY

The present invention thus provides, in a first aspect adapted to a first network architecture, a method of changing over from a primary HSS to a backup HSS in an IP network, said network having a plurality of CSCF (or application) servers, in which method, after detection of a loss of connection between one of said CSCF (or application) servers and a primary HSS to which it is normally connected, the CSCF (or application) server connects itself to a backup HSS. Said method is remarkable in that it also comprises the following steps:

a) a predetermined broadcast device is informed of said loss of connection with said HSS;

b) said broadcast device sends a predetermined fault message at least to the other CSCF (or application) servers that are normally connected to said primary HSS, said message containing the reference of said primary HSS; and c) said other CSCF (or application) servers connect themselves to said backup HSS.

It should be observed that said CSCF server may equally well host a S-CSCF function or an I-CSCF function, or both of them.

By means of these arrangements, all of the CSCF (or application) servers connected to a given primary HSS switch over to the same backup HSS, so that the accuracy of the information stored on the HSS (primary HSS in normal operation, or backup HSS following a loss of connectivity for at least one of the CSCF servers or application servers) is guaranteed on a permanent basis.

According to particular characteristics, said broadcast device comprises said backup HSS.

By means of these provisions, it is the backup HSS itself that advantageously warns the CSCF (or application) servers that are concerned.

According to other particular characteristics, said broadcast device comprises a Subscriber Location Function (SLF) server.

By means of these provisions, the warning is advantageously broadcast by an SLF server. IP networks having a plurality of HSSs conventionally also include an SLF server.

According to yet other particular characteristics, said broadcast device comprises said CSCF (or application) server that detected a loss of connection.

By means of these provisions, the warning is broadcast directly by the CSCF (or application) server that has detected the loss of connection.

In a second aspect adapted to a second network architecture, the present invention also provides a method of switching over from a primary HSS to a backup HSS in an IP network, said network comprising a plurality of CSCF (or application) servers and a plurality of SLF servers performing a proxy function between said CSCF (or application) servers on one hand, and said primary and backup HSSs on the other hand, in which method, after detecting a loss of connection between one of said SLF servers and a primary HSS to which it is normally connected, the SLF server connects itself to a backup HSS. Said method is remarkable in that it also comprises the following steps:

a) a predetermined broadcast device is informed of said loss of connection with said HSS;

b) said broadcast device sends a predetermined fault message at least to the other SLF servers that are normally connected to said primary HSS, said message containing the reference of said primary HSS; and c) said other SLF servers connect themselves to said backup HSS.

By means of the provisions, all of the SLF servers connected to the sane primary HSS switch over to the sane backup HSS so that the accuracy of information recorded on the HSS (primary HSS in normal operation, or backup HSS after a loss of connectivity by at least one of the SLF servers) is guaranteed on a permanent basis.

According to particular characteristics, said broadcast device comprises said backup HSS.

By means of these provisions, it is the backup HSS itself that advantageously warns the SLF servers concerned.

According to other particular characteristics, said broadcast device comprises said SLF server that detected a loss of connection.

By means of these provisions, the warning is broadcast directly by the SLF server that has detected the loss of connection.

Correspondingly, the invention also provides various devices.

Thus, the invention firstly provides a broadcast device for switching over from a primary HSS to a backup HSS in an IP network, said network comprising a plurality of CSCF (or application) servers. Said device comprising means for acting on detection of a loss of connection between one of said CSCF (or application) server and a primary HSS to which it is normally connected, and on said CSCF (or application) server connecting to a backup HSS, to:

a) receive the information about said loss of connection with said HSS; and b) send a predetermined fault message at least to the other CSCF (or application) servers that are normally connected to said primary HSS, said message containing the reference of said primary HSS.

According to particular characteristics, said broadcast device comprises said backup HSS.

According to particular characteristics, said broadcast device comprises an SLF server.

According to yet other particular characteristics, said broadcast device comprises said CSCF (or application) server that detected a loss of connection.

The invention also provides a broadcast device for switching over from a primary HSS to a backup HSS in an IP network, said network comprising a plurality of CSCF (or application) servers and a plurality of SLF servers performing a proxy function between said CSCF (or application) servers on one hand, and said primary and backup HSSs on the other hand, said device comprising means for acting, on detection of a loss of connection between one of said SLF servers and a primary HSS to which it is normally connected, and on connection of said SLF server to a backup HSS, to:

a) receive the information about said loss of connection with said HSS; and b) send a predetermined fault message at least to the other SLF servers that are normally connected to said primary HSS, said message containing the reference of said primary HSS.

According to particular characteristics, said broadcast device comprises said backup HSS.

According to other particular characteristics, said broadcast device comprises said SLF server that detected a loss of connection.

The advantages offered by these devices are essentially the same as those offered by the corresponding methods briefly set out above.

It should be observed that it is possible to implement the devices briefly described above in the context of software instructions and/or in the context of electronic circuits.

The invention also provides a computer program downloadable from a communications network and/or stored on a computer readable medium and/or executable by a microprocessor. This computer program is remarkable in that it comprises instructions suitable, on being executed by a computer, for executing steps of a method of switching over from a primary HSS to a backup HSS briefly described above.

The advantages offered by the computer program are essentially the same as those offered by said methods.

BRIEF DESCRIPTION OF THE DRAWINGS

Other aspects and advantages of the invention appear on reading the following detailed description of particular embodiments given as non-limiting examples. The description refers to the accompanying figures, in which.

DETAILED DESCRIPTION

Figure 1:
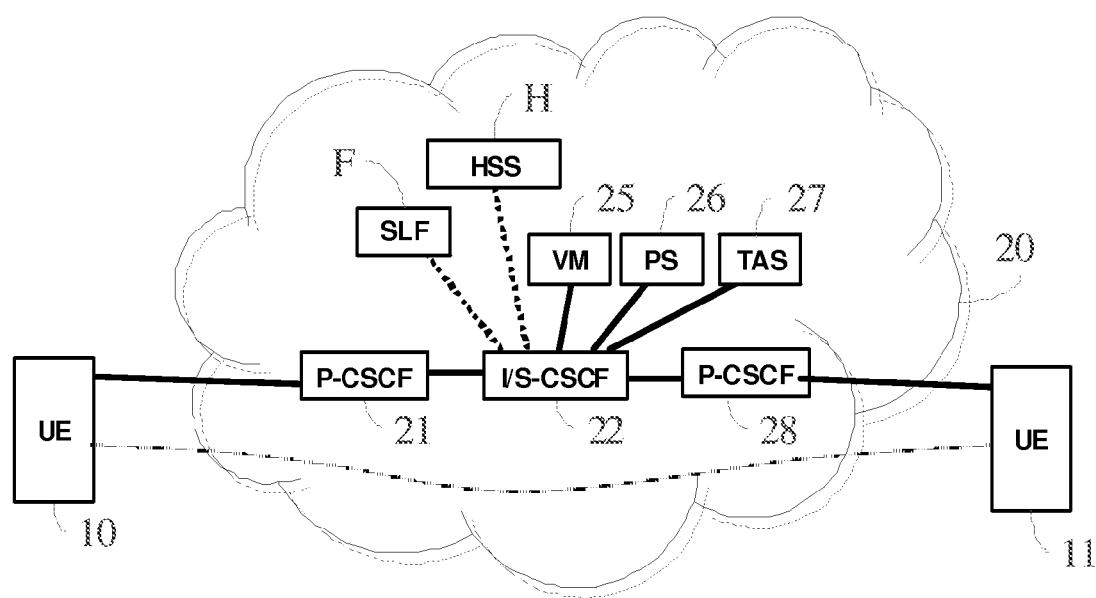
FIG. 1 is a diagram of a general network for providing multimedia services and suitable for implementing the invention.

The system shown in FIG. 1 is based on a network architecture of the IMS type, as described briefly above. The multimedia services offered by such a system may include any of the following services: telephony; video telephony; content sharing; presence; instantaneous messaging; and television. These services are made available to the user of a terminal 10 referred to as user equipment (UE) on a network 20 having an IP transport infrastructure and servers via which the terminal 10 can exchange multimedia streams and session control signals in compliance with SIP, in particular with another UE terminal 11, the terminals 10 and 11 being previously registered with the network 20.

The terminal 10, 11 may be a fixed or a mobile terminal, or a home (or business) gateway, that has SIP signaling means that may include means for playing back audiovisual content.

As shown in FIG. 1, this system for supplying multimedia services relies on a network 20 having the IMS architecture as defined by the 3GPP, and that comprises:

an IP transport infrastructure (not shown);

one or more I/S-CSCF call servers; an I/S-CSCF call server referenced 22 in FIG. 1 acts in particular to manage the procedure for registering devices connected to the network 20; in order for such a device to be capable of benefiting from services provided by the network, and ignoring exceptions (certain emergency calls), the device must register with the I/S-CSCF server 22; the I/S-CSCF server 22 also manages the routing of signaling between the terminal 10 and the voice messaging servers VM 25, presence servers PS 26, and telephony servers TAS 27, and also the routing to other terminals managed by the same IMS network (such as for example the terminal 11), and the routing of signaling between the IMS network 20 and other networks (not shown);

one or more proxy-call server control function (P-CSCF) servers; a P-CSCF server 21 (or 28) is the SIP contact point of the terminal 10 (or 11) in the IMS network; thus, all SIP signaling exchanged between the terminal 10 (or 11) and the I/S-CSCF call server 22 passes via the corresponding P-CSCF server 21 (or 28);

one or more HSS type database servers; an HSS, referenced H in FIG. 1, contains the profile of the user of the terminal 10 in terms of authentication data, location data, and subscribed service data;

optionally, a subscriber location function (SLF) type server; where an SLF server, referenced F in FIG. 1, is used in IP networks that have a plurality of HSSs; more precisely, the SLF server F is interrogated by the I-CSCF and S-CSCF functions in order to find the address of the HSS H that hosts the data relating to the user of the terminal 10; the HSSs and the SLF server F communicate with one another by means of a protocol known as "DIAMETER" (cf. IETF document RFC 3588), that implements authentication, authorization, and accounting functions;

one or more voice messaging (VM) servers 25; a VM server 25 manages the subscription of the terminal 10 to message deposit/consulting events of the user of that terminal, and notifies the terminal 10 when such an event occurs;

one or more presence (PS) servers 26; the PS server 26 manages the subscription of the terminal 10 to presence events that the user of the terminal seeks to monitor, and it notifies the terminal when such an event occurs; and one or more telephony (TAS) servers 27; a TAS server manages the telephone services to which the user of the terminal 10 has subscribed with an operator, such as caller identity (ID) or call forwarding.

Voice messaging VM servers 25, presence PS servers 26, and telephony TAS servers 27 are examples of servers that are known as application servers (AS).

The HSS database server H is contacted in particular:

by the I-CSCF function when registering the terminal 10 in order to allocate an S-CSCF server to the user of that terminal or to discover the S-CSCF server already allocated to that user;

by the S-CSCF function when initially registering the terminal 10 in order to download data concerning the services to which that user has subscribed, including in particular the detection points that will enable the I/S-CSCF server to determine which signaling message it is to route to which AS (such as for example the VM 25, the PS 26, or the TAS 27);

by the S-CSCF function when registering the user of the terminal 10 so as to inform the HSS H about said user being registered with the I/S-CSCF server or about a registration being prolonged;

by the S-CSCF function in order to recover information needed for authenticating the signaling sent by the user of the terminal 10;

by the I-CSCF function on receiving a call, in order to recover the details of the I/S-CSCF server in charge of the subscriber constituting the destination of the call; and by the ASs when depositing or recovering service data.

Figure 2:
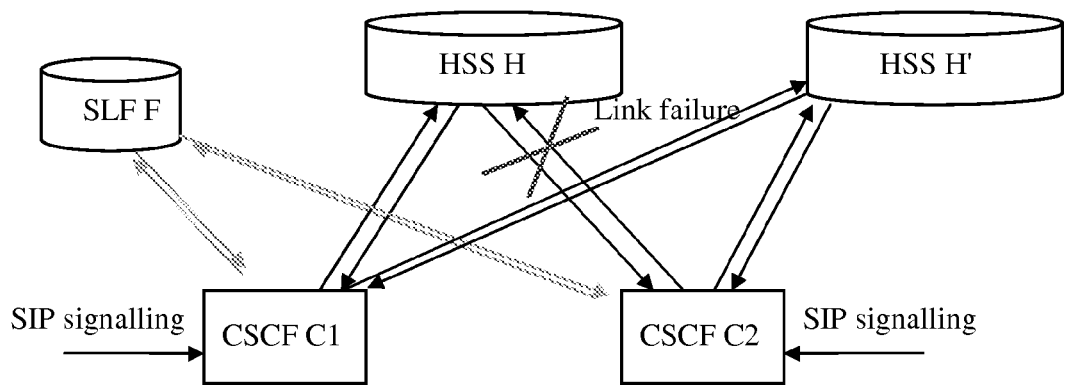
FIG. 2 shows the loss of connection between a CSCF server and the primary HSS to which it is normally connected, in a first network architecture.

The technical problem to which the present invention is addressed is illustrated in FIG. 2 in the context of a network architecture that is given by way of example.

FIG. 2 is a diagram showing two CSCF servers C1 and C2, each hosting one or both of the S-CSCF and I-CSCF functions. The CSCF servers C1 and C2 are both connected to a primary HSS H that is associated with a backup HSS H'. Finally, the CSCF servers C1 and C2 are both connected to an SLF server F.

For example, if the connection between the HSS H and the CSCF C2 becomes faulty, then the CSCF C2 switches over to the HSS H'. However if the connection between the HSS H and the CSCF server C1 continues at that time to operate, then the server C1 does not switch over to the HSS H'. The data recorded subsequently on the servers H and H' will thus become inconsistent, such that the processing of the services rendered to clients can become very degraded (incoming calls sent to the voice mailbox in spite of the call destination being available, and so on).

The problem affecting the CSCF servers naturally affects the ASs in the same manner, and consequently all of the specific examples and implementations described below with reference of CSCF servers apply equally well to ASs.

The operation and the advantages of the present invention are described below with reference to various implementations.

Figure 3:
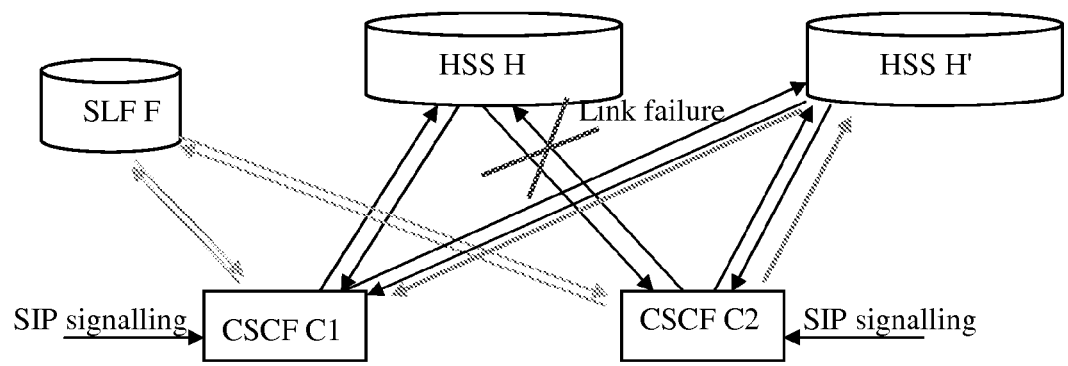
FIG. 3 shows a first implementation of the invention.

FIG. 3 shows a first implementation of the method of the invention. The steps of this method are essentially as follows.

In step E1, the CSCF server C2 observes that it cannot reach H.

In step E2, the server C2 informs the backup HSS H' by means of a DIAMETER message that it cannot reach H, this message preferably being a message other than one of the messages used for supervising the device-watchdog-request (DWR) link; the DIAMETER message may either be a new message or a new attribute-value pair (AVP) in an existing DIAMETER message.

In step E3, the server H' informs all of the CSCF servers that are connected thereto (here the server C1) that the server H cannot be reached by broadcasting a new DIAMETER message (or an existing message with a new AVP).

Finally, in step E4, on receiving this message, the CSCF servers (here the server C1) that have the same primary HSS H switch over to the backup HSS H'.

Figure 4:
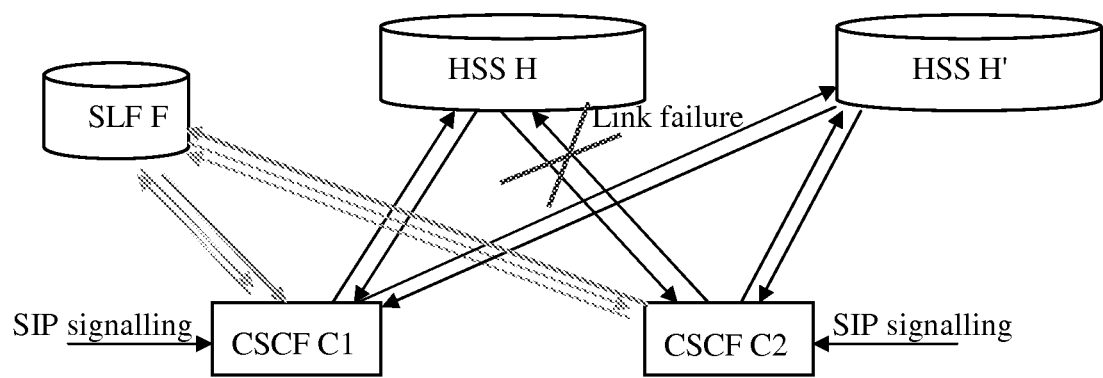
FIG. 4 shows a second implementation of the invention.

FIG. 4 shows a second implementation of the invention. The steps of this method are essentially as follows In step E1, the CSCF server C2 observes that it cannot reach H.

In step E2, the server C2 informs the SLF server F by means of a DIAMETER message that H cannot be reached, which message is preferably a message other than one of those used for supervision of the DWR link; this DIAMETER message may either be a new message or else a new AVP in an existing DIAMETER message.

In step E3, the SLF server F broadcasts a new DIAMETER message (or an existing message with a new AVP) containing the information that H cannot be reached and sent to all of the CSCF servers. In a variant, this message is broadcast only to those CSCF servers that have specifically H as their primary HSS and H' as their backup HSS; the SLF server knows the primary HSS and backup HSS profiles, so it is capable of engaging in targeted broadcasting.

Finally, in step E4, on receiving this message, the CSCF servers (here the server C1) that have the same primary HSS H switch over to the backup HSS H'.

There follows a description of a third implementation (not shown in the figures) of the method of the invention. For transmitting switchover instructions, this method makes use of SIP and "Mw" interfaces (SIP interfaces between I-CSCF, P-CSCF, and S-CSCF servers), by implementing essentially the following steps.

In step E1, the CSCF server C2 observes that H cannot be reached.

In step E2, the server C2 informs all of the other CSCF servers of the IMS network that it has changed over to a backup HSS, specifying the reference (H) of the primary HSS and the reference (H') of the backup HSS; this information may be broadcast either in a new specific request, or else in a new SIP header within an existing request, such as "NOTIFY".

Finally, in step E3, on receiving this message, the CSCF servers (here C1) having the same primary HSS H switch over to the backup HSS H'.

In a variant, this broadcast is addressed only to those CSCF servers that have exactly H as their primary HSS, so as to avoid a general broadcast to all of the other CSCF servers of the IMS network. However implementing this variant nevertheless assumes that each CSCF server is configured in such a manner as to know which of the other CSCF servers have the same primary HSS as itself; unfortunately such a solution is not very practical since it requires frequent modifications of configuration whenever the network is rearranged.

It should be observed that the invention is not necessarily implemented in a network architecture of the type shown in FIGS. 2, 3, and 4. It is possible for the invention to be implemented in other architectures, e.g. an architecture of the type shown in FIG. 5.

Figure 5:
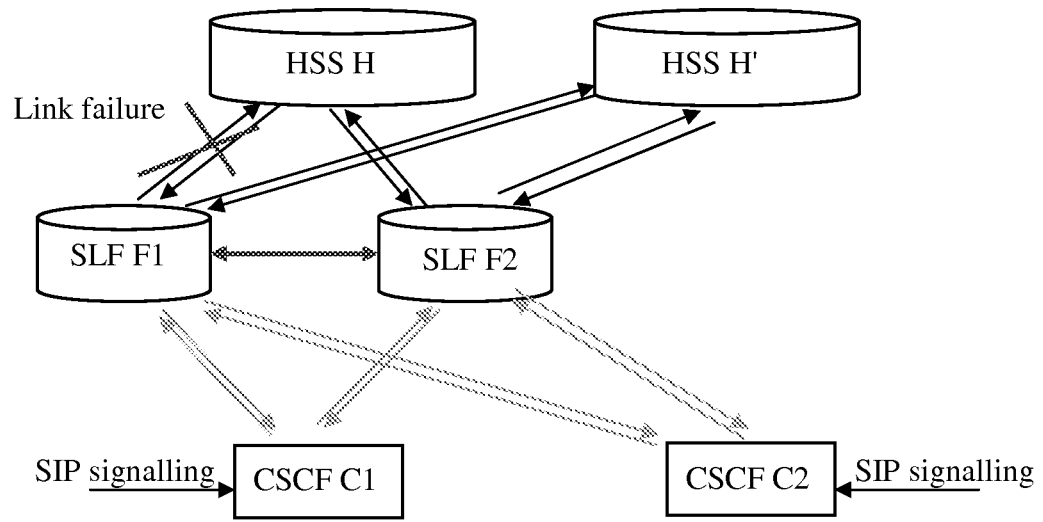
FIG. 5 shows the loss of connection between a CSCF server and the primary HSS to which it is normally connected, in a second network architecture.

FIG. 5 corresponds to a network architecture in which a plurality of SLF servers (here F1 and F2) operate in load sharing and provide a proxy server function between the CSCF servers and the HSSs. If such a structure is used, it is necessary to ensure that the SLF servers share between them the information relating to any switchover of one of them (here F1) to the backup HSS H', so that the other SLF server (here F2) then also switches over to the server H'.

A fourth implementation of the method of the invention is described below that is adapted to the architecture shown in FIG. 5. The steps of this method are essentially as follows.

In step E1, the SLF server F1 observes that H cannot be reached.

In step E2, the server F1 informs the other SLF servers (here F2) of the IMS network with which it is performing load sharing that it has just switched over to the backup HSS H'; this information may be broadcast in a DIAMETER message, preferably a message other than one of those used for supervising the DWR link; this DIAMETER message may either be a new message or a new AVP in an existing DIAMETER message.

Finally, in step E3, on receiving this message, the other SLF servers (here F2) switch over from the primary HSS H to the backup HSS H'.

Finally, a fifth implementation of the method of the invention is described below, this implementation also being adapted to the architecture shown in FIG. 5. The steps of this method are essentially as follows.

In step E1, the SLF server F1 observes that it cannot reach H.

In step E2, the server F1 informs the backup HSS H' that H cannot be reached, doing this by means of a DIAMETER message, and preferably a message other than one of those used for supervising the DWR link; this DIAMETER message may either be a new message or else a new AVP in an existing DIAMETER message.

In step E3, the server H' informs all of the SLF servers that are connected thereto (here F2) that the server H cannot be reached, by broadcasting a new DIAMETER message (or an existing message with a new AVP).

Finally, in step E4, on receiving this message, the SLF servers (here F2) having the same primary HSS H switch over to the backup HSS H'.

The method of the invention may be implemented within nodes of the telecommunications network (more precisely the servers of the HSS, CSCF, SLF, and AS types in the implementations described above) may be performed by means of software components and/or hardware components.

The software components may be incorporated in a conventional computer program for managing a network node. That is why, as mentioned above, the present invention also provides a computer system. In conventional manner, the computer system comprises a central processor unit using signals to control a memory, and also an input unit and an output unit. The computer system may also be used to execute a computer program including instructions for implementing the method of the invention for changing over from a primary HSS to a backup HSS.

The invention also provides a computer program that is downloadable from a communications network and that includes instructions for executing steps of a method of the invention for changing over from a primary HSS to a backup HSS when executed on a computer. The computer program may be stored on a computer readable medium and it may be executable by a microprocessor.

The program may be in any programming language and it may be in the form of source code, object code, or code that is intermediate between source code and object code, such as in a partially compiled form, or in any other desirable form.

The invention also provides a computer-readable data medium that includes instructions of a computer program as mentioned above.

The data medium may be any entity or device capable of storing the program. For example, the medium may comprise storage means such as a read-only memory (ROM), e.g. a compact disk (CD) ROM or a microelectronic circuit ROM, or indeed magnetic recording means, e.g. a floppy disk or a hard disk.

The data medium may also be a transmissible medium such as an electrical or optical signal, suitable for being conveyed via an electrical or optical cable, by radio, or by other means. The computer program of the invention may in particular be downloaded from an Internet type network.

In a variant, the data medium may be an integrated circuit in which the program is incorporated, the circuit being adapted to execute or to be used in the execution of the method of the invention for changing over from a primary HSS to a backup HSS.

The invention claimed is:

1. A method of changing over from a primary home subscriber server (HSS) to a backup HSS in an IP network, said network having a plurality of call server control function (CSCF) or application servers, in which method, after one of said CSCF or application servers has detected a loss of its connection to a primary HSS to which it is supposed to be connected, the CSCF or application server connects itself to a backup HSS, the method comprising the following steps:
   a) a predetermined broadcast device is informed of said loss of connection with said HSS;
   b) said broadcast device sends a predetermined fault message to at least one other CSCF or application server that is supposed to be connected to said primary HSS, said message containing a reference of said primary HSS; and
   c) said at least one other CSCF or application server connects itself to said backup HSS.

2. The switchover method according to claim 1, wherein said broadcast device comprises said backup HSS.

3. The switchover method according to claim 1, wherein said broadcast device comprises a subscriber location function (SLF) server.

4. The switchover method according to claim 1, wherein said broadcast device comprises said CSCF or application server that detected a loss of connection.

5. Non-transitory Data storage elements that are non-removable, partially removable, or totally removable, and including computer program code instructions for executing steps of a method of switching over from a primary HSS to a backup HSS according to claim 1.

6. A method of switching over from a primary home subscriber server (HSS) to a backup HSS in an IP network, said network comprising a plurality of call server control function (CSCF) or application servers and a plurality of subscriber location function (SLF) servers performing a proxy function between:
   said CSCF or application servers, and
   said primary and backup HSSs,
in which method, after one of said SLF servers has detected a loss of its connection to a primary HSS to which it is supposed to be connected, the SLF server connects itself to a backup HSS, the method comprising the following steps:
  a) a predetermined broadcast device is informed of said loss of connection with said HSS;
  b) said broadcast device sends a predetermined fault message to at least one other SLF server that is supposed to be connected to said primary HSS, said message containing a reference of said primary HSS; and
  c) said other SLF server connects itself to said backup HSS.

7. The switchover method according to claim 6, wherein said broadcast device comprises said backup HSS.

8. The switchover method according to claim 6, wherein said broadcast device comprises said SLF server that detected a loss of connection.

9. A broadcast device for switching over from a primary home subscriber server (HSS) to a backup HSS in an IP network, said network comprising a plurality of call server control function (CSCF) or application servers, said device comprising means for acting, after one of said CSCF or application server has detected a loss of connection to a primary HSS to which it is supposed to be connected, and on said CSCF or application server connecting itself to a backup HSS, to:
  a) receive the information about said loss of connection with said HSS; and
  b) send a predetermined fault message to at least one other CSCF or application server that is supposed to be connected to said primary HSS, said message containing a reference of said primary HSS.

10. The broadcast device according to claim 9, further comprising said backup HSS.

11. The broadcast device according to claim 9, further comprising a subscriber location function (SLF) server.

12. The broadcast device according to claim 9, further comprising said CSCF or application server that detected a loss of connection.

13. A broadcast device for switching over from a primary home subscriber server (HSS) to a backup HSS in an IP network, said network comprising a plurality of call server control function (CSCF) or application servers and a plurality of subscriber location function (SLF) servers performing a proxy function between:
  said CSCF or application servers, and
  said primary and backup HSSs,
said device comprising means for acting, after one of said SLF servers has detected a loss of its connection to a primary HSS to which it is supposed to be connected, and on connection of said SLF server to a backup HSS, to:
  a) receive the information about said loss of connection with said HSS; and
  b) send a predetermined fault message to at least one other SLF server that is supposed to be connected to said primary HSS, said message containing a reference of said primary HSS.

14. The broadcast device according to claim 13, further comprising said backup HSS.

15. The broadcast device according to claim 13, further comprising said SLF server that detected a loss of connection.

16. A non-transitory computer-readable medium comprising a computer program executable by a microprocessor, the program being characterized in that it includes instructions for executing steps of a method of switching over from a primary home subscriber server (HSS) to a backup HSS according to claim 1 on being executed by a computer.

* * * * *